US011895152B2

(12) United States Patent
Skelton et al.

(10) Patent No.: US 11,895,152 B2
(45) Date of Patent: Feb. 6, 2024

(54) SYSTEMS AND METHODS FOR ESTABLISHING A SECURE COMMUNICATION LINK IN AN ELECTRIC POWER DELIVERY SYSTEM

(71) Applicant: Schweitzer Engineering Laboratories, Inc., Pullman, WA (US)

(72) Inventors: Duane C. Skelton, Bellingham, WA (US); Colin Gordon, Katy, TX (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 425 days.

(21) Appl. No.: 17/400,260

(22) Filed: Aug. 12, 2021

(65) Prior Publication Data

US 2023/0050220 A1     Feb. 16, 2023

(51) Int. Cl.
    *H04L 9/40*          (2022.01)
    *H04L 9/08*          (2006.01)
    *H02J 13/00*        (2006.01)

(52) U.S. Cl.
    CPC ...... *H04L 63/162* (2013.01); *H02J 13/00006* (2020.01); *H04L 9/0838* (2013.01); *H04L 63/062* (2013.01); *H04L 63/0853* (2013.01); *H02J 13/00036* (2020.01)

(58) Field of Classification Search
CPC ... H04L 63/162; H04L 9/0838; H04L 63/062; H04L 63/0853; H04L 63/0428; H04L 63/06; H04L 9/0894; H02J 13/00006; H02J 13/00036; H02J 13/00001
See application file for complete search history.

(56) References Cited

U.S. PATENT DOCUMENTS

| | | | |
|---|---|---|---|
| 7,729,276 B2 | 6/2010 | Akyol | |
| 11,662,760 B2 * | 5/2023 | Cioraca | G05B 15/02 700/292 |
| 2019/0116183 A1 | 4/2019 | Hussain | |
| 2019/0173860 A1 * | 6/2019 | Sankaran | H04L 9/3273 |
| 2019/0342101 A1 | 11/2019 | Hayes | |
| 2020/0106719 A1 | 4/2020 | Acharya | |

* cited by examiner

*Primary Examiner* — Izunna Okeke
(74) *Attorney, Agent, or Firm* — Fletcher Yoder, P.C.; Richard M. Edge

(57) ABSTRACT

A non-transitory computer readable medium includes instructions that, when executed by processing circuitry, are configured to cause the processing circuitry to operate in a recovery mode after initiating a startup operation, transmit a data frame to a device of an electric power delivery system during the recovery mode, the data frame indicating a request for a security association key (SAK), receive the SAK from the device in response to transmitting the data frame, and use the SAK to communicate data via a media access control security (MACsec) communication link.

18 Claims, 6 Drawing Sheets

SYSTEMS AND METHODS FOR ESTABLISHING A SECURE COMMUNICATION LINK IN AN ELECTRIC POWER DELIVERY SYSTEM

BACKGROUND

This disclosure relates to electric power delivery systems. More particularly, this disclosure relates to establishing a secure communication link between devices of an electric power delivery system.

Electric power delivery systems carry electricity from a transmission system to residential communities, factories, industrial areas, and other electricity consumers. An electric power delivery system may include various intelligent electronic devices (IEDs) that may communicate with other devices of the electric power delivery system during operation of the electric power delivery system. For example, the IED may receive and/or transmit a signal and/or data in order to perform a functionality, such as to control a circuit breaker in response to electrical measurements of the electric power delivery system. Unfortunately, it may be difficult to establish a secure communication link between the IED and other devices of the electric power delivery system to enable the devices to securely communicate with one another. For example, when a device starts up or initiates operation, there may be a period of time in which a secure communication link is not established with the device, such as due to an absent key server or other component for distributing keys that establish secure communication links. As such, the device may not be able to securely communicate data during that period of time.

DETAILED DESCRIPTION

Figure 1:
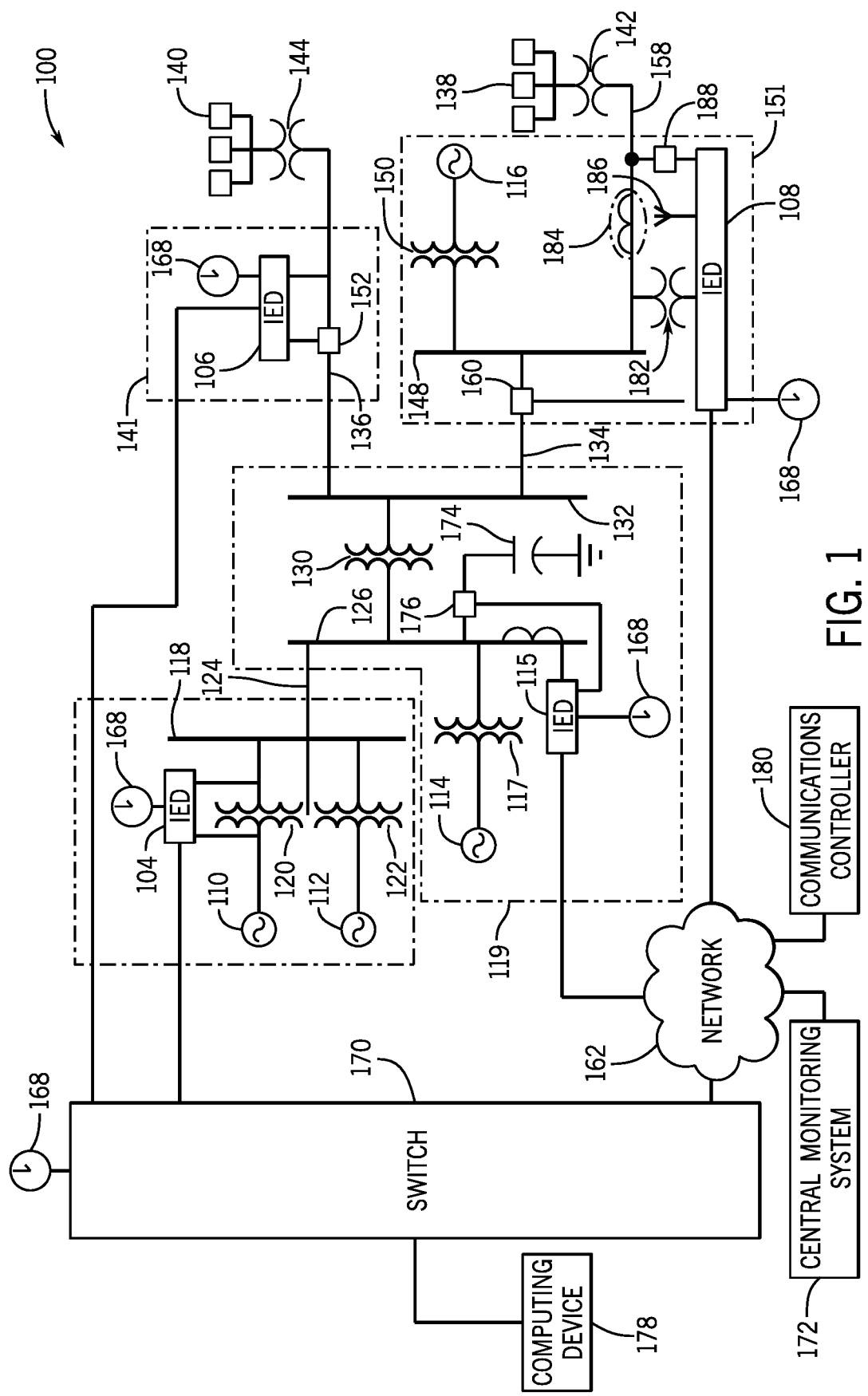
FIG. 1 is a schematic diagram of an electric power delivery system, in accordance with an aspect of the present disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be noted that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase "A or B" is intended to mean A, B, or both A and B.

Several aspects of the embodiments described may be implemented as software modules or components. As used herein, a software module or component may include any type of computer instruction or computer-executable code located within a memory device and/or transmitted as electronic signals over a system bus or wired or wireless network. A software module or component may, for instance, include physical or logical blocks of computer instructions, which may be organized as a routine, program, object, component, data structure, or the like, and which performs a task or implements a particular abstract data type.

In certain embodiments, a particular software module or component may include disparate instructions stored in different locations of a memory device, which together implement the described functionality of the module. Indeed, a module or component may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a tangible, non-transitory, computer-readable and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, compact disc read-only memories (CD-ROMs), digital versatile disc read-only memories (DVD-ROMs), read-only memories (ROMs), random access memories (RAMs), erasable programmable read-only memories (EPROMs), electrically erasable programmable read-only memories (EEPROMs), magnetic or optical cards, solid-state memory devices, or other types of machine-readable media suitable for storing electronic and/or processor executable instructions.

The present disclosure relates to establishing a secure communication link or channel between devices of an electric power delivery system or an electric power distribution system. Intelligent electronic devices (IEDs) may be used to control certain devices and to perform certain operations of the electric power delivery system. For example, an IED may be a relay that enables or blocks electrical power flow between other devices of the electric power delivery system. The IED may, for instance, communicate with a computing device, and the IED may operate based on the communication with the computing device (e.g., based on a user input). Furthermore, multiple IEDs may transmit data, such as operating information or sensor data, to one another to control various functions of devices of the electric power delivery system. As such, the IEDs may facilitate operation of the electric power delivery system.

Any of the IEDs may use a media access control security (MACsec) communication link and/or a MACsec key agreement (MKA) connectivity association to communicate data. To establish the MACsec communication link, an MKA protocol is used to enable communications between devices of the electric power delivery system. During the MKA protocol, a device that acts as a key server, such as a switch, a controller, or another IED, may select a connectivity association key (CAK) from a set of keys (e.g., a generated set of keys, a received set of keys) and distribute the CAK or a copy of the CAK to an IED via an adoption link (e.g., an Ethernet link, a pre-stored MKA link) established between the device and the IED. An MKA connectivity association may be established between the device and the IED based on verification that the IED possesses the CAK. The device may then select a security association key (SAK) from the set of the keys for distribution to the IED via the MKA connectivity association. The device may retain a copy of the same SAK, and the IED may use its copy of the SAK to establish a MACsec communication link for communicating data. For example, the IED may encrypt data using its copy of the SAK and/or may decrypt encrypted data using its copy of the SAK in order to transmit data securely with another device via the MACsec communication link.

In some circumstances, the keys may not be readily available for establishing MKA connectivity associations and/or the MACsec communication links. By way of example, the IED may not have certain keys (e.g., SAKs) during performance of a startup or cold boot operation (e.g., a startup MACsec operation). As used herein, the startup or cold boot operation includes an operation in which a device initiates from a state (e.g., a shutdown state, a powerless state) in which a memory of the device, which may include a key (e.g., a SAK) stored from a previous MKA connectivity association and/or MACsec communication link, was cleared. For this reason, the IED may perform the MKA protocol and/or communicate with a dedicated key server in order to obtain a new key for establishing or re-establishing secure communication links. However, during the period of time in which the IED performs the startup operation, performs the MKA protocol, and/or awaits for the key from the key server, the IED may not be able to communicate securely. Thus, the operation of the electric power delivery system may be affected.

Accordingly, embodiments of the present disclosure relate to operation of an IED in a recovery mode that reduces the time in which the IED may establish a secure communication link (e.g., a MACsec communication link) with another device. In some embodiments, during the recovery mode, the IED may transmit a request to other devices (e.g., other IEDs) of the electric power delivery system for an available SAK for establishing a MACsec communication link. After verifying an identity of the IED, another device may transmit a SAK (e.g., a SAK that is currently being used by the other device) to the IED. In additional or alternative embodiments, during the recovery mode, the IED may convert a previously stored CAK (e.g., a CAK stored in non-volatile memory) into a SAK for establishing the MACsec communication link. In this manner, performing the recovery mode may obtain a SAK without having to perform the MKA protocol and/or receive the SAK from a dedicated key server. Indeed, the IED may communicate securely using the obtained SAK until a newly generated SAK has been received (e.g., via the MKA protocol, from a dedicated key server). Thus, operation of the recovery mode may facilitate establishing secure communications more quickly and may improve the operation of the electric power delivery system.

With the preceding in mind, FIG. 1 is a schematic diagram of an electric power delivery system or an electric power distribution system 100 that may generate, transmit, and/or distribute electric energy to various loads (e.g., different structures). The electric power delivery system 100 may use various IEDs 104, 106, 108, 115 to control certain aspects of the electric power delivery system 100. As used herein, an IED (e.g., the IEDs 104, 106, 108, 115) may refer to any processing-based device that monitors, controls, automates, and/or protects monitored equipment within the electric power delivery system 100. Although the present disclosure primarily discusses the IEDs 104, 106, 108, 115 as relays, such as a remote terminal unit, a differential relay, a distance relay, a directional relay, a feeder relay, an overcurrent relay, a voltage regulator control, a voltage relay, a breaker failure relay, a generator relay, and/or a motor relay, additional IEDs 104, 106, 108, 115 may include an automation controller, a bay controller, a meter, a recloser control, a communications processor, a computing platform, a programmable logic controller (PLC), a programmable automation controller, an input and output module, and the like. Moreover, the term IED may be used to describe an individual IED or a system including multiple IEDs.

For example, the electric power delivery system 100 may be monitored, controlled, automated, and/or protected using the IEDs 104, 106, 108, 115, and a central monitoring system 172 (e.g., an industrial control system). In general, the IEDs 104, 106, 108, 115 may be used for protection, control, automation, and/or monitoring of equipment in the electric power delivery system 100. For example, the IEDs 104, 106, 108, 115 may be used to monitor equipment of many types, including electric power lines, electric power lines, current sensors, busses, switches, circuit breakers, reclosers, transformers, autotransformers, tap changers, voltage regulators, capacitor banks, generators, motors, pumps, compressors, valves, and a variety of other suitable types of monitored equipment.

A common time signal may be distributed throughout the electric power delivery system 100. Utilizing a common time source may ensure that IEDs 104, 106, 108, 115 have a synchronized time signal that can be used to generate time synchronized data, such as synchrophasors. In various embodiments, the IEDs 104, 106, 108, 115 may receive a common time signal 168. The time signal may be distributed in the electric power delivery system 100 using a communications network 162 and/or using a common time source, such as a Global Navigation Satellite System ("GNSS"), or the like.

The IEDs 104, 106, 108, 115 may be used for controlling various other equipment of the electrical power delivery system 100. By way of example, the illustrated electric power delivery system 100 includes electric generators 110, 112, 114, 116 and power transformers 117, 120, 122, 130, 142, 144, 150. The electric power delivery system 100 may also include electric power lines 124, 134, 136, 158 and/or busses 118, 126, 132, 148 to transmit and/or deliver power, circuit breakers 152, 160, 176 to control flow of power in the electric power delivery system 100, and/or loads 138, 140 to receive the power in and/or from the electric power delivery system 100. A variety of other types of equipment may also be included in the electric power delivery system 100, such as a voltage regulator, a capacitor (e.g., a capacitor 174), a potential transformer (e.g., a potential transformer 182), a current sensor (e.g., a wireless current sensor (WCS) 184), an antenna (e.g., an antenna 186), a capacitor banks (e.g., a capacitor bank (CB) 188), and other suitable types of equipment useful in power generation, transmission, and/or distribution.

A substation 119 may include the electric generator 114, which may be a distributed generator and which may be connected to the bus 126 through the power transformer 117 (e.g., a step-up transformer). The bus 126 may be connected to the bus 132 (e.g., a distribution bus) via the power transformer 130 (e.g., a step-down transformer). Various electric power lines 136, 134 may be connected to the bus 132. The electric power line 136 may lead to a substation 141 in which the electric power line 136 is monitored and/or controlled using the IED 106, which may selectively open and close the circuit breaker 152. The load 140 may be fed from the electric power line 136, and the power transformer 144 (e.g., a step-down transformer) in communication with the bus 132 via electric power line 136 may be used to step down a voltage for consumption by the load 140.

The electric power line 134 may deliver electric power to the bus 148 of the substation 151. The bus 148 may also receive electric power from the distributed electric generator 116 via the power transformer 150. The electric power line 158 may deliver electric power from the bus 148 to the load 138 and may include the power transformer 142 (e.g., a step-down transformer). The circuit breaker 160 may be used to selectively connect the bus 148 to the electric power line 134. The TED 108 may be used to monitor and/or control the circuit breaker 160 as well as the electric power line 158.

According to various embodiments, the central monitoring system 172 may include one or more of a variety of types of systems. For example, the central monitoring system 172 may include a supervisory control and data acquisition (SCADA) system and/or a wide area control and situational awareness (WACSA) system. A switch 170 may be in communication with the IEDs 104, 106, 108, 115. The IEDs 104, 106, 108, 115 may be remote from the switch 170 and may communicate over various media. For instance, the switch 170 may be directly in communication with the IEDs 104, 106 and may be in communication with the IEDs 108, 115 via the communications network 162.

The switch 170 may enable or block data flow between any of the IEDs 104, 106, 108, 115. For example, during operation of the electric power delivery system 100, the IEDs 104, 106, 108, 115 may transmit data with one another to perform various functionalities for the electric power delivery system 100 by initially transmitting the data to the switch 170. The switch 170 may receive the data and may subsequently transmit the data to an intended recipient of the data. The switch 170 may also control data flow between one of the IEDs 104, 106, 108, 115 and another device communicatively coupled to the switch 170, such as a computing device 178. For instance, the computing device 178 may be a laptop, a mobile phone, a desktop, a tablet, or another suitable device with which a user (e.g., a technician, an operator) may interact. As such, the user may utilize the computing device 178 to receive data, such as operating data, from the electric power delivery system 100 via the switch 170 and/or to send data, such as a user input, to the electric power delivery system 100 via the switch 170. Thus, the switch 170 may enable or block operation of the electric power delivery system 100 via the computing device 178.

A communications controller 180 may interface with equipment in the communications network 162 to create a software-defined network that facilitates communication between the switch 170, the IEDs 104, 106, 108, 115, and/or the central monitoring system 172. In various embodiments, the communications controller 180 may interface with a control plane (not shown) in the communications network 162. Using the control plane, the communications controller 180 may direct the flow of data within the communications network 162. Indeed, the communications controller 180 may communicate with the switch 170 to instruct the switch 170 to transmit certain data (e.g., data associated with a certain set of characteristics or information) to a particular destination (e.g., an intended recipient) using flows, matches, and actions defined by the communications controller 180.

In some embodiments, the switch 170 and the IEDs 104, 106, 108, 115 may communicate with one another via an MKA connectivity association and/or a MACsec communication link or channel. The MACsec communication link may be established via SAKs distributed to enable encryption and/or decryption of data. To this end, the switch 170 or another key device (e.g., a key server) may generate and distribute keys, such as CAKs and/or SAKs, to the IEDs 104, 106, 108, 115 to establish the MKA connectivity association and/or the MACsec communication link. For instance, the switch 170 may establish an MKA connectivity association with one of the IEDs 104, 106, 108, 115 via an MKA protocol that includes establishing an adoption link between the switch 170 and the IED, distributing a CAK to the IED via the adoption link, establishing an MKA connectivity association with the IED based on a verified possession of the CAK, distributing a SAK to the IED via the MKA connectivity association, and communicating data with the IED using the SAK. Indeed, the switch 170 and the IED may use copies of the same SAK to encrypt data to be transmitted as well as to decrypt encrypted data that has been received. Such encrypted data is transmitted via a MACsec communication link established between the devices to communicate the data securely. Although the present disclosure primarily discusses the use of MKA connectivity associations and MACsec communication links to communicate data, any other suitable communication techniques may be used to communicate data between devices of the electric power delivery system 100.

Any of the IEDs 104, 106, 108, 115 may operate in a recovery mode (e.g., a fast recovery mode) to facilitate establishment of a MACsec communication link with another device (e.g., with another of the IEDs 104, 106, 108, 115) during or after startup operation. In an embodiment of the recovery mode, the IED may transmit a request to another device (e.g., another IED) of the electric power delivery system 100 for a SAK and receive the SAK for immediate or near immediate usage to establish a MACsec communication link. In an additional or an alternative embodiment of the recovery mode, the IED may convert a CAK that is stored onto a memory of the IED into a SAK to establish a MACsec communication link. In either embodiment, the IED may establish a MACsec communication link more quickly as compared to obtaining the SAK by performing the MKA protocol and/or receiving the SAK from a dedicated key server (e.g., the switch 170). Thus, the IED may more readily be able to communicate securely with other devices of the electric power delivery system 100.

Figure 2:
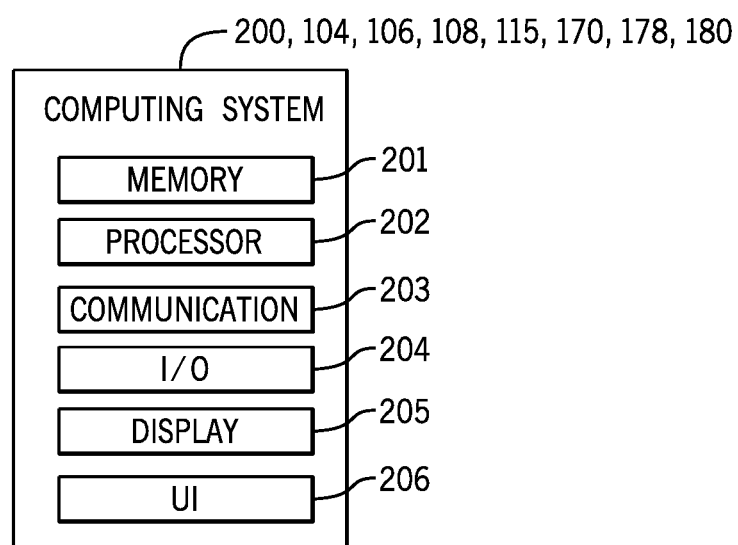
FIG. 2 is a schematic diagram of a computing system that may be incorporated in a device of an electric power delivery system, in accordance with an aspect of the present disclosure.

FIG. 2 is a schematic diagram of an embodiment of a computing system 200 that may be incorporated within a device of the electric power delivery system 100, such as in any of the IEDs 104, 106, 108, 115, the switch 170, and/or the computing device 178. The computing system 200 may include a memory 201 and a processor or processing circuitry 202. The memory 201 may include a non-transitory computer-readable medium that may store instructions that, when executed by the processor 202, may cause the processor 202 to perform various methods described herein. To this end, the processor 202 may be any suitable type of computer processor or microprocessor capable of executing computer-executable code, including but not limited to one or more field programmable gate arrays (FPGA), application-specific integrated circuits (ASIC), programmable logic devices (PLD), programmable logic arrays (PLA), and the like. The processor 202 may, in some embodiments, include multiple processors.

The computing system 200 may also include a communication system 203, which may include a wireless and/or wired communication component to establish a communication link with another device of the electric power delivery system 100. That is, the communication system 203 enables the computing system 200 (e.g., of one of the IEDs 104, 106, 108, 115) to communication with another communication system 203 of another computing system 200 (e.g., of the switch 170). Indeed, the communication system 203 may include any suitable communication circuitry for communication via a personal area network (PAN), such as Bluetooth or ZigBee, a local area network (LAN) or wireless local area network (WLAN), such as an 802.11x Wi-Fi network, and/or a wide area network (WAN), (e.g., third-generation (3G) cellular, fourth-generation (4G) cellular, near-field communications technology, universal mobile telecommunication system (UMTS), long term evolution (LTE), long term evolution license assisted access (LTE-LAA), fifth-generation (5G) cellular, and/or 5G New Radio (5G NR) cellular). The communication system 203 may also include a network interface to enable communication via various protocols such as EtherNet/IP®, ControlNet®, DeviceNet®, or any other industrial communication network protocol.

Additionally, the computing system 200 may include input/output (I/O) ports 204 that may be used for communicatively coupling the computing system 200 to an external device. For example, the I/O ports 204 of the computing system 200 of the switch 170 may communicatively couple to corresponding I/O ports 204 of the computing system 200 of the computing device 178. The computing system 200 may further include a display 205 that may present any suitable image data or visualization. Indeed, the display 205 may present image data that includes various information regarding the electric power delivery system 100, thereby enabling the user to observe an operation, a status, a parameter, other suitable information, or any combination thereof, of the electric power delivery system 100. Further still, the computing system 200 may include a user interface (UI) 206 with which the user may interact to control an operation of the computing system 200. For instance, the UI 206 may include a touch screen (e.g., as a part of the display 205), an eye-tracking sensor, a gesture (e.g., hand) tracking sensor, a joystick or physical controller, a button, a knob, a switch, a dial, a trackpad, a mouse, another component, or any combination thereof. As an example, the user may utilize the UI 206 of the computing system 200 of the computing device 178 to transmit data to the switch 170.

Figure 3:
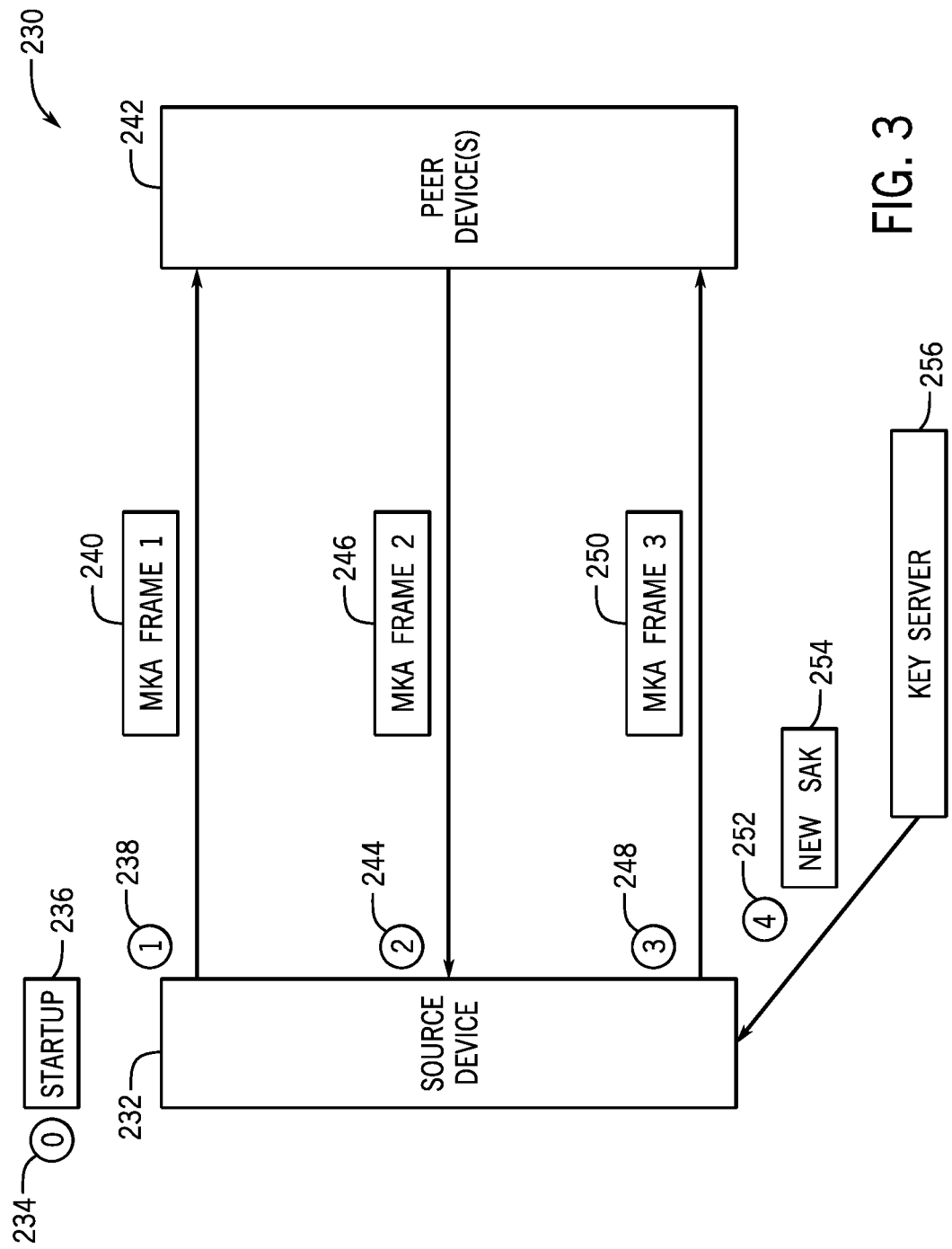
FIG. 3 is a schematic diagram illustrating a method for establishing a secure communication link after a startup operation of a device of an electric power delivery system, in accordance with an aspect of the present disclosure.

FIG. 3 is a schematic diagram 230 illustrating a method in which a source device 232 may operate in a recovery mode. As described herein, the source device 232 includes any suitable device (e.g., one of the IEDs 104, 106, 108, 115) of the electric power delivery system 100 that operates in the recovery mode to establish a secure communication link (e.g., a MACsec communication link) after a startup operation. For example, the source device 232 may have previously been in operation in which a previous MKA connectivity association and/or a previous MACsec communication link was established between the source device 232 and another device of the electric power delivery system 100. However, the source device 232 may transition to a state (e.g., a shutdown state or a powerless state) in which such secure communication links may no longer be established. For example, transitioning from the state to a normal operation of the source device 232 may clear a memory of the source device 232 such that the source device 232 may no longer possess a SAK for maintaining a MACsec communication link. However, it may be time consuming to perform the MKA protocol and/or to communicate with a dedicated key server to obtain a new SAK for establishing a new MACsec communication link. Indeed, the MKA protocol may involve performing multiple procedures to generate and distribute the new SAK, and/or the dedicated key server may not be readily available to transmit the new SAK. Therefore, the source device 232 may operate in the recovery mode in order to obtain a SAK more quickly to communicate data securely.

At an initial block 234, the source device 232 may perform a startup operation 236 upon initiation (e.g., powering on). The startup operation may include any procedures that prepare the source device 232 for a normal operation, such as an operation in which the source device 232 communicates with other devices of the electric power delivery system 100. By way of example, the startup operation 236 may include clearing certain memory (e.g., volatile memory) and apportioning power. In some embodiments, the source device 232 may initiate performance of the startup operation 236 manually, such as in response to a user input (e.g., pressing a button, actuating a switch). In additional or alternative embodiments, the source device 232 may initiate performance of the startup operation 236 automatically, such as based on a pre-scheduled maintenance and/or a detected faulty operation. During the startup operation 236, the source device 232 may not be in secure communication with any other device of the electric power delivery system 100.

As such, during or after performance of the startup operation 236, the source device 232 may operate in a recovery mode to establish a secure communication link between the source device 232 and another device of the electric power delivery system 100. At a first block 238 of the recovery mode, the source device 232 may transmit a first MKA frame 240 (e.g., a first MKA Ethernet data frame, a first MACsec key agreement protocol data unit (MKPDU)) to a peer device 242 of the electric power delivery system 100, such as via an Ethernet link established between the source device 232 and the peer device 242. The peer device 242 may include another device (e.g., another IED) that may currently be in operation, such as to communicate data securely, and may therefore be in possession of a SAK. The first MKA frame 240 may be indicative of a request for an available SAK. For example, the first MKA frame 240 may include a basic or standard MKA frame parameter set or information to indicate data transmission as well as a custom parameter set that indicates the request for the available SAK. The custom parameter set may include a value (e.g., an empty cached MACsec SAK user parameter set) to indicate that the source device 232 transmitting the first MKA frame 240 is operating in the recovery mode and is requesting for the available SAK.

In some embodiments, the source device 232 may transmit a predefined number of first MKA frames 240 at the first block 238. As an example, the source device 232 may transmit respective copies of the first MKA frame 240 at specific time stamps (e.g., one millisecond, four milliseconds, eight milliseconds) after initiation of the recovery mode. Transmitting multiple bursts of the first MKA frame 240 may increase the probability of receiving a SAK, such as in case a SAK is not received after transmission of an initial first MKA frame 240.

In response to receipt of the first MKA frame 240, the peer device 242 may verify an identity of the source device 232. As an example, the peer device 242 may determine the identity of the source device 232 based on the first MKA frame 240 and determine whether an MKA connectivity association and/or MACsec communication link was previously established with the source device 232 (e.g., prior to the source device 232 transitioning to the shutdown state or powerless state). To this end, the peer device 242 may store a record of all devices or participants of an MKA connectivity association, as well as data associated with the devices, and the peer device 242 will recognize the source device 232 as a previous participant of the MKA connectivity association based on the information transmitted via the first MKA frame 240, such as information indicative of a CAK previously used by and/or stored in a memory of the source device 232 and/or information indicative of a media access control (MAC) address of the source device 232.

At a second block 244, upon verifying the identity of the source device 232, the peer device 242 may transmit a second MKA frame 246 (e.g., a second MKA Ethernet data frame, a second MKPDU) to the source device 232. The second MKA frame 246 may include the basic MKA frame parameter set, a new custom parameter set indicative of transmission of a SAK, the SAX itself, and metadata associated with the SAK. The SAK may, for example, include a copy of a SAK that is currently in use by, stored on, or otherwise in possession by the peer device 242 (e.g., a SAK generated by the peer device 242, a SAK transmitted from a different key server to the peer device 242). The metadata may include certain information indicative of an operation of the source device 232, such as a most recent key association number, a most recent lowest acceptable packet number, and so forth, to help the source device 232 use the SAK. Indeed, the receipt of the metadata from the peer device 242 may facilitate operation of the source device 232 after the recovery mode without having to constantly store, change, update, overwrite, and so forth, the metadata on memory (e.g., non-volatile memory) that is not cleared during the recovery mode. Certain metadata may be calculated by the peer device 242 prior to transmission to the source device 232 in an example embodiment.

In some embodiments, the peer device 242 may encrypt the SAK for secure transmission to the source device 232. As an example, the peer device 242 may use application support sublayer encrypted key wrap using a CAK (e.g., the CAK previously used by the source device 232). However, the peer device 242 may additionally or alternatively use any other suitable form of encryption to distribute the SAK securely to the source device 232.

At a third block 248, in response to receipt of the second MKA frame 246 from the peer device 242, the source device 232 may exit operation in the recovery mode and communicate data via a MACsec communication link using the SAK received from the peer device 242. For example, the source device 232 may transmit a third MKA frame 250 (e.g., a third MKA Ethernet data frame, a third MKPDU) to the peer device 242, and the third MKA frame 250 may indicate that the source device 232 is using the SAK received from the second MKA frame 246 to communicate normally via the MACsec communication link. For instance, the third MKA frame 250 may include the basic MKA frame parameter set and MACsec SAX use parameter sets corresponding to the metadata received via the second MKA frame 246. Subsequently, the source device 232 may communicate data securely using the SAK received from the peer device 242 and indicate, via the third MKA frame 250, to other devices of the electric power delivery system 100 that the source device 232 is operating MACsec normally.

In certain embodiments, after receipt of the SAK from the peer device 242 as a result of operation in the recovery mode, at a fourth block 252, the source device 232 may receive a new SAK 254 from a key server 256, such as a dedicated key server and/or the peer device 242. For example, during and/or after operation in the recovery mode, the source device 232 may perform the MKA protocol with the peer device 242 and/or communicate with the key server 256 to receive the new SAK 254. After receiving the new SAK 254, the source device 232 may transmit data securely using the new SAK 254 instead of using the SAK received via the second MKA frame 246. Accordingly, the source device 232 may use the SAK received during the recovery mode until the new SAK 254 has been obtained.

The source device 232 may transmit the first MKA frames 240 to multiple peer devices 242 of the electric power delivery system 100, such as by multicasting and/or unicasting the first MKA frames 240 to different peer devices 242, in certain embodiments. As a result, any of the peer devices 242 that is in possession of an available SAK may transmit (e.g., unicast) a corresponding second MKA frame 246 to the source device 232. Thus, the source device 232 may receive different SAKs in response. For this reason, the source device 232 may analyze the metadata associated with the different SAKs to select one of the SAKs for communicating data via a MACsec communication link.

Furthermore, in certain embodiments, a peer device 242 that currently is not in possession of an available SAK may continue operating without transmitting the second MKA frame 246 to the source device 232. Thus, in some circumstances, the source device 232 may not receive any SAKs during operation in the recovery mode (e.g., when none of the peer devices 242 receiving the first MKA frame 240 is in possession of an available SAX). In response, the source device 232 may not communicate data via a MACsec communication link until a SAK has been obtained via the MKA protocol and/or from the key server 256.

Further still, in some embodiments, during the recovery mode, the source device 232 may generate a SAX, such as via a CAK (e.g., a CAK used in a previous operation of the source device 232) stored in a memory of the source device 232, such as a memory that is not cleared as a result of the startup operation 236. By way of example, prior to receiving the second MKA frame 246, the source device 232 may convert a stored CAK to a first SAK and use the first SAX to communicate data via a first MACsec communication link. Then, upon receiving a second SAX via the second MKA frame 246 as a result of transmission of the first MKA frame 240, the source device 232 may use the second SAK to communicate data via a second MACsec communication link instead of using the first SAK to communicate data via the first MACsec communication link. Moreover, upon receiving a third SAK via the key server 256, the source device 232 may use the third SAK to communicate data via a third MACsec communication link instead of using the second SAK to communicate data via the second MACsec communication link. By converting a CAK to a SAK in the recovery mode, the source device 232 may be able to communicate data via a MACsec communication link prior to receiving a SAK from a peer device 242, thereby enabling data communication via a MACsec communication link even more quickly upon performing the startup operation 236. As an example, during circumstances in which no device is in possession of a SAK (e.g., when multiple devices are not in operation and/or are restarting operation), the source device 232 may nevertheless be able to communicate data via a MACsec communication link by using the SAK converted from a stored CAK.

Each of FIGS. 4-7 described below illustrates a method associated with an operation (e.g., by any of the IEDs 104, 106, 108, 115) with respect to a recovery mode of the source device 232. In some embodiments, each of the methods may be performed by a single respective component or system, such as by the computing system 200 (e.g., the processor 202). In additional or alternative embodiments, multiple components or systems may perform the procedures for a single one of the methods. It should also be noted that additional procedures may be performed with respect to the described methods. Moreover, certain procedures of the depicted methods may be removed, modified, and/or performed in a different order. Further still, the procedures of any of the respective methods may be performed in parallel with one another, such as at the same time and/or in response to one another.

Figure 4:
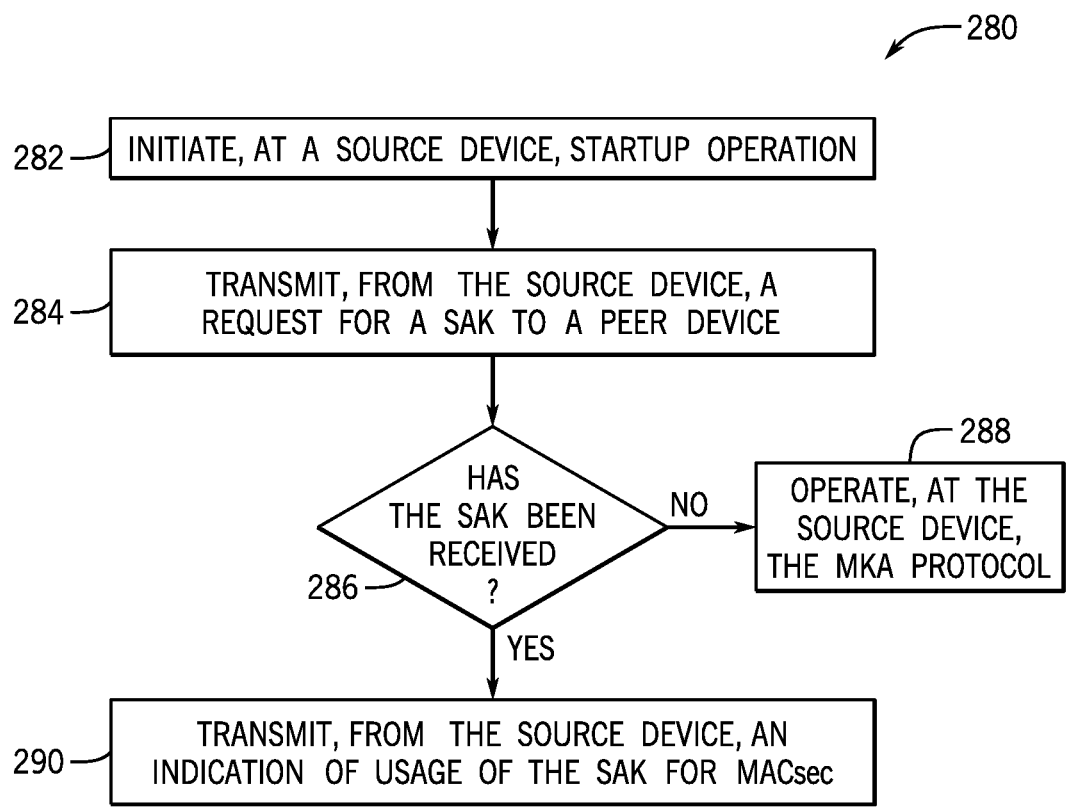
FIG. 4 is a flowchart of a method for operating a source device in a recovery mode to establish a secure communication link for an electric power delivery system, in accordance with an aspect of the present disclosure.

FIG. 4 is a flowchart of a method 280 for operating the source device 232 in a recovery mode (e.g., a first recovery mode) to obtain a SAK for establishing a secure communication link to communicate data securely. At block 282, the source device 232 may initiate the startup operation 236. For example, the source device 232 may initiate the startup operation 236 based on a user input, such as a user interaction with a component (e.g., a button) of the source device 232. Additionally or alternatively, the source device 232 may initiate the startup operation 236 automatically, such as based on a schedule and/or based on received data (e.g., data indicative of an operation of the source device 232). The startup operation 236 may include transitioning the source device 232 out of a shutdown state or a powerless state to prepare for a normal operating state. During the startup operation 236, the source device 232 may not be in possession of a SAK for establishing a MACsec communication link.

At block 284, the source device 232 may transmit a request for a SAK to one or more peer devices 242. By way of example, the source device 232 may transmit the request via an MKA frame (e.g., the first MKA frame 240). In some embodiments, the source device 232 may transmit multiple MKA frames, such as respective MKA frames at various time stamps during operation of the source device 232 in the recovery mode and/or respective MKA frames to different peer devices 242. The transmission of multiple MKA frames may increase the probability of receiving a SAK from one of the peer devices 242.

At block 286, the source device 232 may determine whether a SAK has been received from one of the peer devices 242 in response to the request transmitted by the source device 232. At block 288, in response to a determination that the SAK has not been received, the source device 232 may perform the MKA protocol to obtain a different SAX. For example, the source device 232 may perform the MKA protocol to receive a SAK newly generated by a different device, such as another device and/or a key server, without receiving the SAK from the peer device 242 in response to transmission of the request. The source device 232 may then operate using the SAK obtained via the MKA protocol by establishing a MACsec communication link for communicating data.

At block 290, in response to receiving the SAK from the peer device 242, the source device 232 may use the SAK received from the peer device 242 to establish a MACsec communication link and transmit an indication that the source device 232 is using the SAK to communicate data via the MACsec communication link. For instance, the source device 232 may receive the SAK via an MKA frame (e.g., the second MKA frame 246) transmitted by the peer device 242, and the source device 232 may transmit a corresponding MKA frame (e.g., the third MKA frame 250) that indicates the source device 232 is using the SAK to communicate data. In this manner, the source device 232 may indicate (e.g., to other devices) that the source device 232 is operating normally to communicate data via a MACsec communication link established by using the SAK received from the peer device 242.

Figure 5:
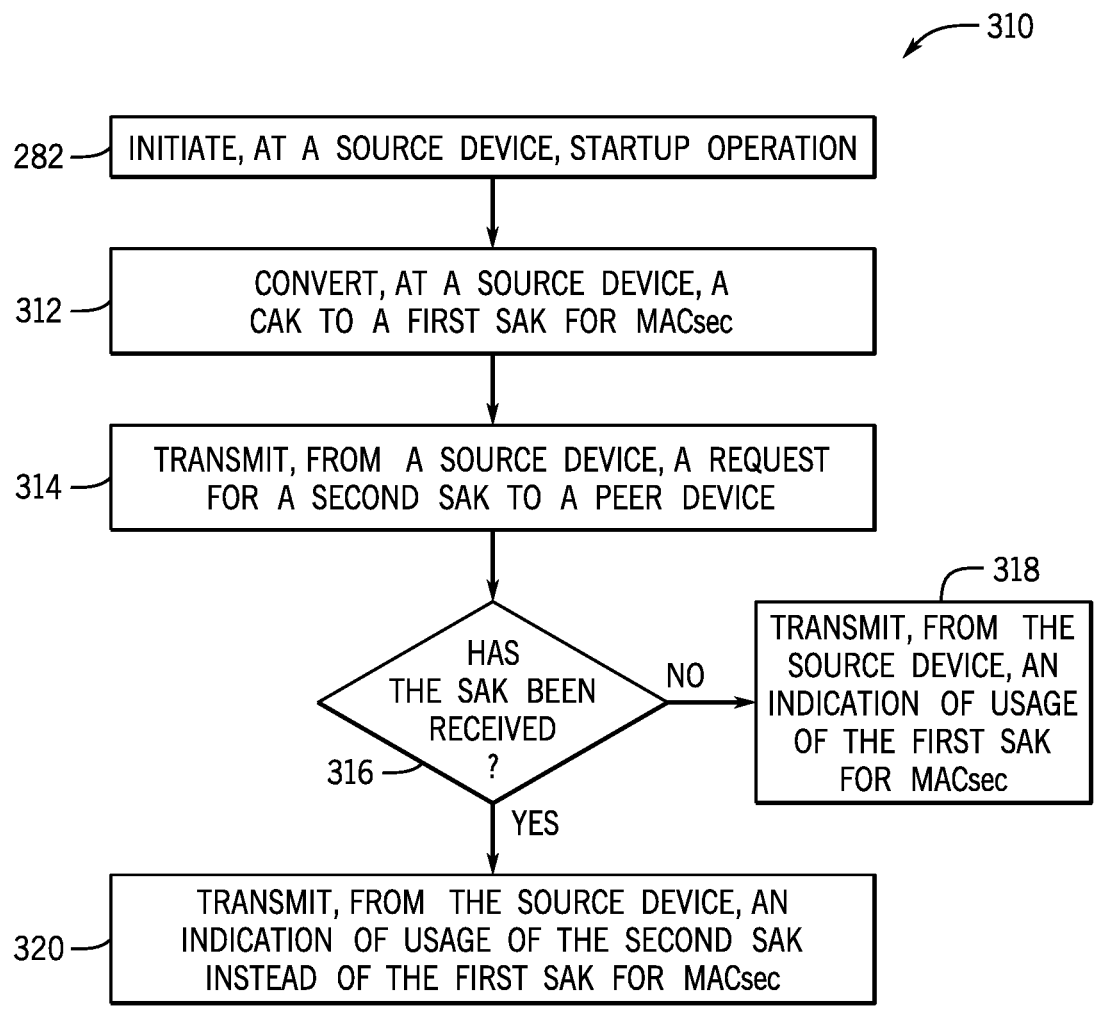
FIG. 5 is a flowchart of a method for operating a source device in a recovery mode to establish a secure communication link for an electric power delivery system, in accordance with an aspect of the present disclosure.

FIG. 5 is a flowchart of a method 310 for operating the source device 232 in a recovery mode (e.g., a second recovery mode) to obtain a SAX. At block 282, the source device 232 may initiate the startup operation 236. At block 312, the source device 232 may convert a stored CAK into a first SAX. The CAK may, for example, have been used in a previous operation of the source device 232, such as a normal operation of the source device 232 prior to the startup operation 236. In some embodiments, the source device 232 may also generate metadata (e.g., the packet number) associated with the first SAK for usage to communicate data via a MACsec communication link. For instance, the metadata may be calculated based on operating data associated with the source device 232 (e.g., recorded packet numbers of recent SAKs).

Furthermore, at block 314, the source device 232 may also transmit a request for a second SAK to a peer device 242, such as via an MKA frame. At block 316, the source device 232 may determine whether the second SAK has been received from the peer device 242. At block 318, in response to a determination that the second SAK has not been received, the source device 232 may use the first SAK to establish a MACsec communication link for communicating data and transmit an indication that the first SAK is being used to communicate data via the MACsec communication link. That is, the source device 232 may indicate that the source device 232 is operating normally to communicate data via a MACsec communication link established by using the first SAX. In this manner, while the source device 232 awaits the second SAK from the peer device 242, the source device 232 may communicate data via a MACsec communication link using the first SAX.

Additionally, at block 320, in response to a determination that the second SAK has been received from the peer device 242, the source device 232 may use the second SAK to establish a MACsec communication link for communicating data and transmit an indication that the second SAK is being used to communicate data via the MACsec communication link. That is, upon receiving the second SAX, the source device 232 may use the second SAK instead of the first SAK to communicate data. As such, the source device 232 may indicate that the source device 232 is operating normally to communicate data via a MACsec communication link established by using the second SAX.

Operation of the recovery mode based on the method 310 may enable the source device 232 to communicate data via a SAK regardless of whether a SAK has been received from the peer device 242. For example, in circumstances in which no SAK has been received from any peer device 242, such as when the peer devices 242 are not in possession of SAKs (e.g., the peer devices 242 have also initiated startup operations), the source device 232 may nevertheless communicate data via a MACsec communication link by using a SAK generated from a stored CAK. Further, in circumstances in which a peer device 242 is in possession of a SAX, but has yet to transmit the SAK to the source device 232, the source device 232 may nevertheless communicate data via a MACsec communication link by using the SAK generated from the stored CAK (e.g., while awaiting for the SAK to be received from the peer device 242). Thus, operation of the recovery mode based on the method 310 may facilitate the source device 232 to communicate data via a MACsec communication link more quickly upon initiating the startup operation 236.

It should be noted that, in some embodiments, after performance of either of the recovery modes described with respect to the method 280 or the method 310, the source device 232 may receive a newly generated SAX, such as from the peer device 242, the key server 256, and/or another device (e.g., as a result of performing the MKA protocol). In response, the source device 232 may use the newly generated SAK to communicate data via a MACsec communication link. In other words, the source device 232 may use the newly generated SAX instead of the SAK received from the peer device 242 and/or the SAK converted from a stored CAK in order to communicate data. The source device 232 may also transmit an indication that the source device 232 is operating normally to communicate data via a MACsec communication link established by using the newly generated SAX. Additionally, in certain embodiments, the source device 232 may operate in the recovery mode described with respect to the method 280 or the recovery mode described with respect to the method 310 based on a user input. That is, the user input may indicate a selection to enable operation of the source device 232 in one of the recovery modes or neither of the recovery modes, and the source device 232 may operate according to the user input.

Figure 6:
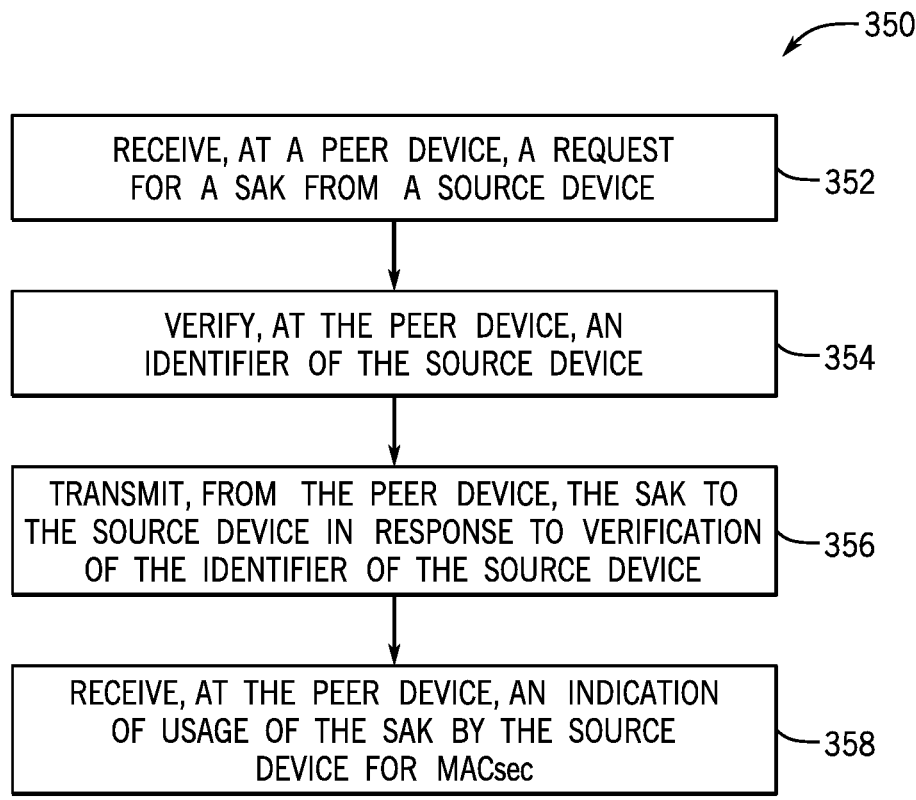
FIG. 6 is a flowchart of a method for operating a peer device to communicate with a source device that is operating in a recovery mode to establish a secure communication link for an electric power delivery system, in accordance with an aspect of the present disclosure.

FIG. 6 is a flowchart of a method 350 for operating the peer device 242 to communicate with the source device 232 that is operating in a recovery mode, such as the recovery mode described with respect to the method 280 and/or the recovery mode described with respect to the method 310. At block 352, the peer device 242 may receive a request for a SAK as transmitted by the source device 232, such as via the procedure described with respect to the block 284 of the method 280 or with respect to the block 314 of the method 310. The request may, for instance, include an MKA frame (e.g., the first MKA frame 240).

At block 354, the peer device 242 may verify an identity of the source device 232. By way of example, the peer device 242 may determine information indicative of a CAK previously used by the source device 232 and/or information indicative of a MAC address of the source device 232 based on the request (e.g., the MKA frame) received from the source device 232. Based on such information, the peer device 242 may recognize the source device 232 as a previous participant of an MKA connectivity association, such as based on the information matching corresponding information associated with a currently absent participant of the MKA connectivity association. As such, the peer device 242 may verify that the MKA connectivity association is to be re-established with the source device 232 and that the source device 232 is to receive a SAK.

At block 356, in response to verifying the identity of the source device 232, the peer device 242 may transmit a copy of a SAK that is currently being used by the peer device 242. For example, the peer device 242 may have previously generated the SAK (e.g., to establish a MACsec communication link with another device of the electric power delivery system 100) and/or received the SAK from a key server that generated the SAK. In some embodiments, the peer device 242 may transmit an MKA frame (e.g., the second MKA frame 246), such as by unicasting unicast multiple MKA frames, to the source device 232. The MKA frame may include the SAK, as well as metadata associated with the SAK. The metadata may facilitate usage of the SAK by the source device 232 to communicate data via a MACsec communication link.

At block 358, in response to transmission of the SAK to the source device 232, the peer device 242 may receive an indication that the source device 232 is using the SAK for communicating data via a MACsec communication link. As an example, the peer device 242 may receive another MKA frame (e.g., the third MKA frame 250) transmitted from the source device 232 to the peer device 242. The MKA frame may, as an example, indicate that the source device 232 is operating normally to communicate data via a MACsec communication link established by using the SAK transmitted from the peer device 242 to the source device 232.

Additionally, in some embodiments, the peer device 242 may receive an additional indication of a usage of another SAK by the source device 232 to communicate data. The additional indication may show that the source device 232 is operating normally to communicate data via a MACsec communication link established by using a SAK that is different from the SAX transmitted with respect to the block 356. By way of example, the additional indication may include another MKA frame that indicates usage of a SAK generated from a CAK stored at the source device 232 and/or a SAK received from a different device (e.g., a different peer device 242, the key server 256). The additional indication may also include metadata associated with the other SAX, and the peer device 242 may use the metadata to communicate with the source device 232 accordingly (e.g., using a copy of the other SAX). As such, the peer device 242 may determine the manner in which to communicate with the source device 232 based on the additional indication.

Figure 7:
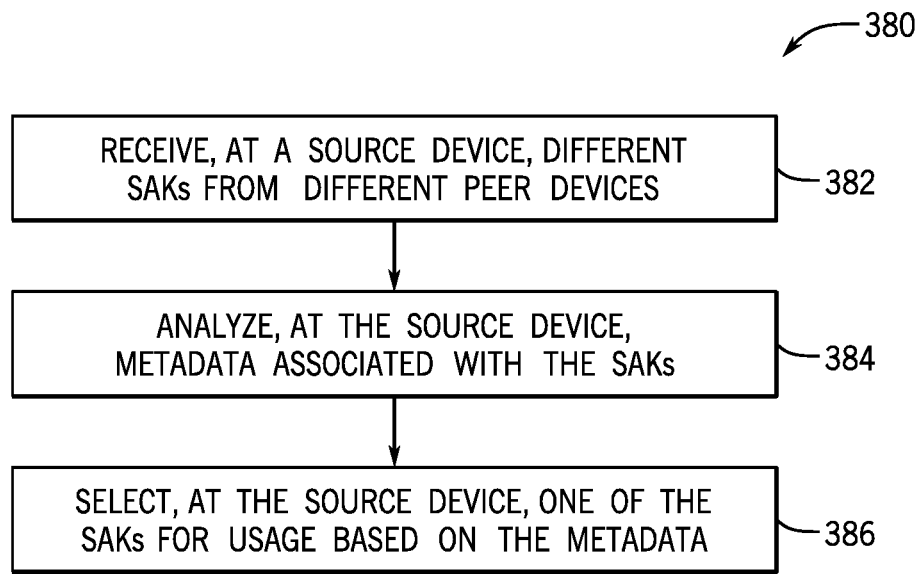
FIG. 7 is a flowchart of a method for operating a source device to select a key to establish a secure communication link for an electric power delivery system, in accordance with an aspect of the present disclosure.

FIG. 7 is a flowchart of a method 380 for operating the source device 232 to select a SAX to establish a secure communication link. As an example, the source device 232 may perform the method 380 as part of the recovery mode described with respect to the method 280 and/or the recovery mode described with respect to the method 310. At block 382, the source device 232 may receive different SAKs from different peer devices 242. As an example, the SAKs may be received in response to requests transmitted from the source device 232 to multiple peer devices 242 as described with respect to the block 284 of the method 280 and/or with respect to the block 314 of the method 310. The source device 232 may also receive the metadata associated with each of the SAKs.

At block 384, the source device 232 may analyze the metadata associated with each of the SAKs. The respective metadata associated with the SAKs may differ from one another, even though the SAKs may be copies of the same SAX. As such, the source device 232 may compare the different metadata with one another. At block 386, the source device 232 may select one of the SAKs for communicating data based on the metadata. That is, the source device 232 may identify a SAK that may be most suitable for usage based on the metadata, and the source device 232 may use the selected SAK establish a MACsec communication link for communicating data. In addition, upon selection of the SAX, the source device 232 may transmit an indication that the source device 232 is operating normally to communicate data via the MACsec communication link established by using the selected SAK.

In some embodiments, such as embodiments in which copies of different SAKs are received, the source device 232 may use the SAK having metadata associated with the highest association number. In additional or alternative embodiments, such as embodiments in which multiple copies of the same SAK are received (e.g., the respective metadata associated with the SAKs have the same association number), the source device 232 may use the SAK having metadata associated with the highest packet number. As such, the source device 232 may select a single one of the SAK based on the metadata for communicating data via a MACsec communication link.

While specific embodiments and applications of the disclosure have been illustrated and described, it is to be understood that the disclosure is not limited to the precise configurations and components disclosed herein. For example, the systems and methods described herein may be applied to an industrial electric power delivery system or an electric power delivery system implemented in a boat or oil platform that may or may not include long-distance transmission of high-voltage power. Accordingly, many changes may be made to the details of the above-described embodiments without departing from the underlying principles of this disclosure. The scope of the present disclosure should, therefore, be determined only by the following claims.

Indeed, the embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims. In addition, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . ." or "step for [perform]ing [a function] . . .", it is intended that such elements are to be interpreted under 35 U.S.C. 112(f). For any claims containing elements designated in any other manner, however, it is intended that such elements are not to be interpreted under 35 U.S.C. 112(f).

What is claimed is:

1. A non-transitory computer readable medium, comprising instructions, wherein the instructions, when executed by the processing circuitry, are configured to cause the processing circuitry to perform operations comprising:
   operating in a recovery mode after initiating a startup operation;
   converting a stored connectivity association key (CAK) to an initial security association key (SAK) during the recovery mode;
   using the initial SAK to communicate data via an initial media access control security (MACsec) communication link;
   transmitting a data frame to a device of an electric power delivery system during the recovery mode, wherein the data frame is indicative of a request for a SAK;
   receiving the SAK from the device in response to transmitting the data frame;
   using the SAK received from the device instead of the initial SAK converted from the stored CAK to communicate data via the MACsec communication link instead of via the initial MACsec communication link; and
   using the SAK received from the device instead of the initial SAK converted from the stored CAK to communicate the data via the MACsec communication link instead of via the initial MACsec communication link.

2. The non-transitory computer readable medium of claim 1, wherein the instructions, when executed by the processing circuitry, are configured to cause the processing circuitry to transmit an additional data frame to the device in response to receiving the SAK, wherein the additional data frame indicates usage of the SAK to communicate data via the MACsec communication link.

3. The non-transitory computer readable medium of claim 1, wherein the instructions, when executed by the processing circuitry, are configured to cause the processing circuitry to transmit an additional data frame to the device in response to converting the CAK to the initial SAK, wherein the additional data frame indicates usage of the initial SAK to communicate data via the initial MACsec communication link.

4. The non-transitory computer readable medium of claim 1, wherein the instructions, when executed by the processing circuitry, are configured to cause the processing circuitry to perform operations comprising:
   receiving an additional SAK from a key server of the electric power delivery system after receiving the SAK from the device; and
   using the additional SAK received from the key server instead of the SAK received from the device to communicate data via an additional MACsec communication link instead of via the MACsec communication link.

5. The non-transitory computer readable medium of claim 1, wherein the instructions, when executed by the processing circuitry, are configured to cause the processing circuitry to receive the SAK via an additional data frame transmitted by the device.

6. The non-transitory computer readable medium of claim 1, wherein the instructions, when executed by the processing circuitry, are configured to cause the processing circuitry to transmit multiple copies of the data frame at different time stamps of operation in the recovery mode.

7. An intelligent electronic device (IED) of an electric power delivery system, wherein the TED comprises:
   processing circuitry; and a memory comprising instructions, wherein the instructions, when executed by the processing circuitry, are configured to cause the processing circuitry to perform operations comprising:

receiving a request for a security association key (SAK) from an additional TED of the electric power delivery system, the request including an initial SAK converted from a stored connectivity association key (CAK), communicated via an initial media access control security (MACsec) communication link;

verifying an identity of the additional TED based on the request; and in response to verifying the identity of the additional TED, transmitting a copy of a stored SAK to the additional TED for communicating data via a MACsec communication link instead of via the initial MACsec communication link using the stored SAK instead of the initial SAK.

8. The IED of claim 7, wherein the instructions, when executed by the processing circuitry, are configured to cause the processing circuitry to perform operations comprising:

receiving the request for the SAK via a data frame transmitted by the additional IED; and verifying the identity of the additional IED based on information associated with the data frame.

9. The IED of claim 8, wherein the instructions, when executed by the processing circuitry, are configured to cause the processing circuitry to perform operations comprising:

storing information associated with participants of a MACsec key agreement (MKA) connectivity association;

determining that the information associated with the data frame matches with information associated with one of the participants of the MKA connectivity association to indicate that the additional IED is a previous participant of the MKA connectivity association; and verifying the identity of the additional IED in response to determining that the information associated with the data frame matches with the information associated with one of the participants of the MKA connectivity association.

10. The IED of claim 8, wherein the information comprises a media access control address, a connectivity association key (CAK) used in a previous operation of the additional IED, or both.

11. The IED of claim 7, wherein the instructions, when executed by the processing circuitry, are configured to cause the processing circuitry to receive a data frame from the additional IED in response to transmitting the copy of the stored SAK to the additional IED, wherein the data frame indicates usage of the copy of the stored SAK by the additional IED to communicate data via the MACsec communication link.

12. The IED of claim 11, wherein the instructions, when executed by the processing circuitry, are configured to receive an additional data frame from the additional IED after receiving the data frame from the additional IED, wherein the additional data frame indicates usage of an additional SAK by the additional IED instead of the copy of the stored SAK.

13. The IED of claim 7, wherein the instructions, when executed by the processing circuitry, are configured to cause the processing circuitry to transmit a data frame to the additional IED in response to verifying the identity of the additional IED, wherein the data frame comprises the copy of the stored SAK to the additional IED and metadata associated with the copy of the stored SAK.

14. A system, comprising:

a first intelligent electronic device (IED) configured to communicate data via a security association key (SAK) and configured to perform operations comprising:

converting a stored connectivity association key (CAK) to copy of an SAK during a recovery mode;

using the copy of the SAK to communicate data via an initial media access control security (MACsec) communication link; and a second TED configured to perform operations comprising:

transmitting, during operation in a recovery mode of the first TED, a request to the first TED for an available SAK;

receiving the copy of the SAK from the first TED in response to the request;

transmitting an indication to the first TED regarding usage of the copy of the SAK to communicate data via a MACsec communication link instead of the initial MACsec communication link using the SAK instead of the copy of the SAK.

15. The system of claim 14, comprising a third IED, wherein the second IED is configured to perform operations comprising:

transmitting, during operation in the recovery mode, an additional request to the third IED for an additional available SAK;

receiving a copy of an additional SAK from the third IED;

analyzing first metadata of the copy of the SAK and second metadata of the additional SAK; and selecting the copy of the SAK to communicate data via the MACsec communication link based on the first metadata and the second metadata.

16. The system of claim 15, wherein the second IED is configured to select the copy of the SAK in response to a first packet number of the first metadata being greater than a second packet number of the second metadata, a first association number of the first metadata being greater than a second association number of the second metadata, or both.

17. The system of claim 15, wherein the second IED is configured to perform operations comprising:

receiving the CAK from the first IED after receiving the copy of the SAK from the first IED;

establishing a MACsec key agreement (MKA) connectivity association with the first IED using the CAK;

receiving an additional SAK from the first IED via the MKA connectivity association; and transmitting an indication to the first IED regarding usage of the additional SAK instead of the copy of the SAK to communicate data via an additional MACsec communication link instead of via the MACsec communication link.

18. The system of claim 14, comprising a key server configured to transmit an additional SAK to the second IED, and wherein the second IED is configured to transmit an indication to the first IED regarding usage of the additional SAK instead of the copy of the SAK to communicate data via an additional MACsec communication link instead of via the MACsec communication link.

* * * * *